Nov. 14, 1939.   R. W. SKERRATT   2,179,865
BELT SHIFTER
Filed Dec. 7, 1937   2 Sheets-Sheet 1
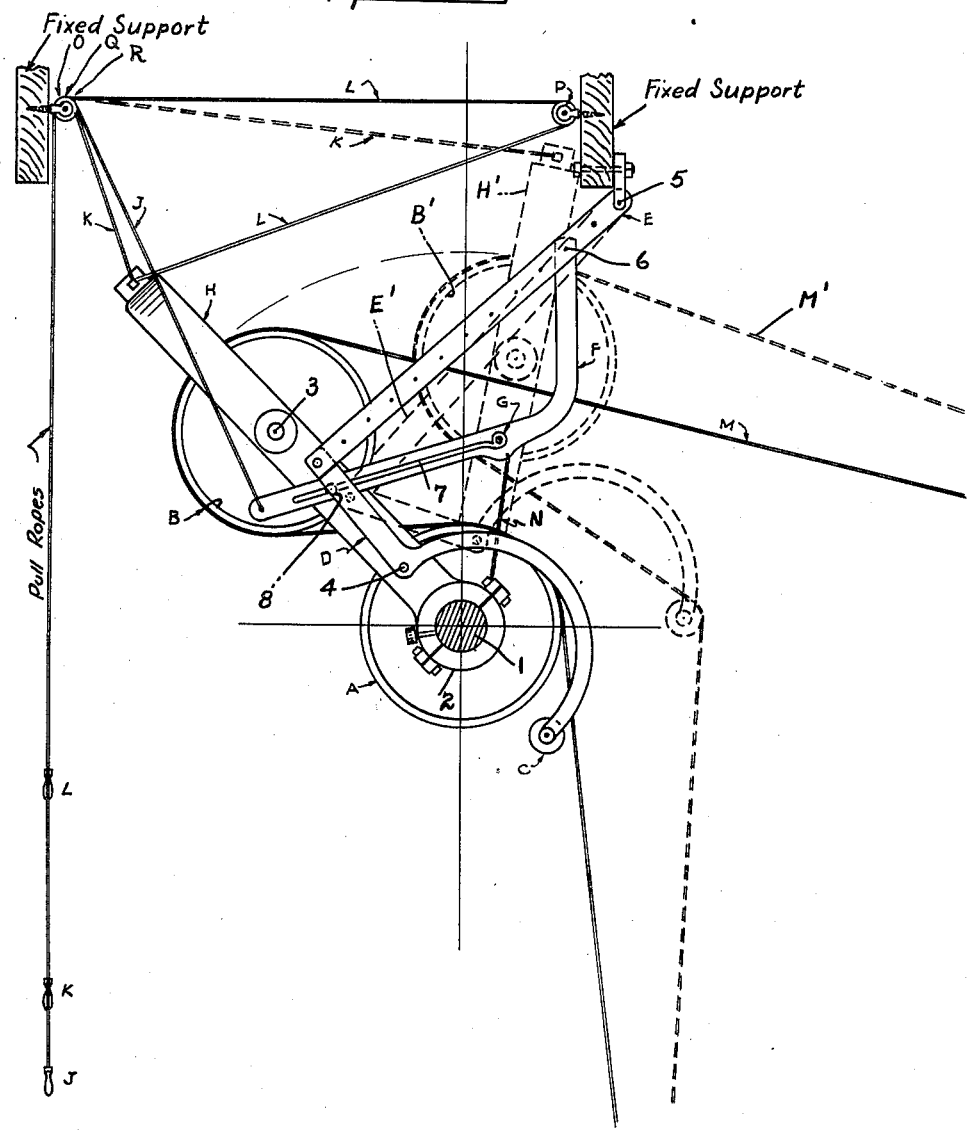
INVENTOR:
Ralph W. Skerratt
by Christy and Wharton
his attorneys

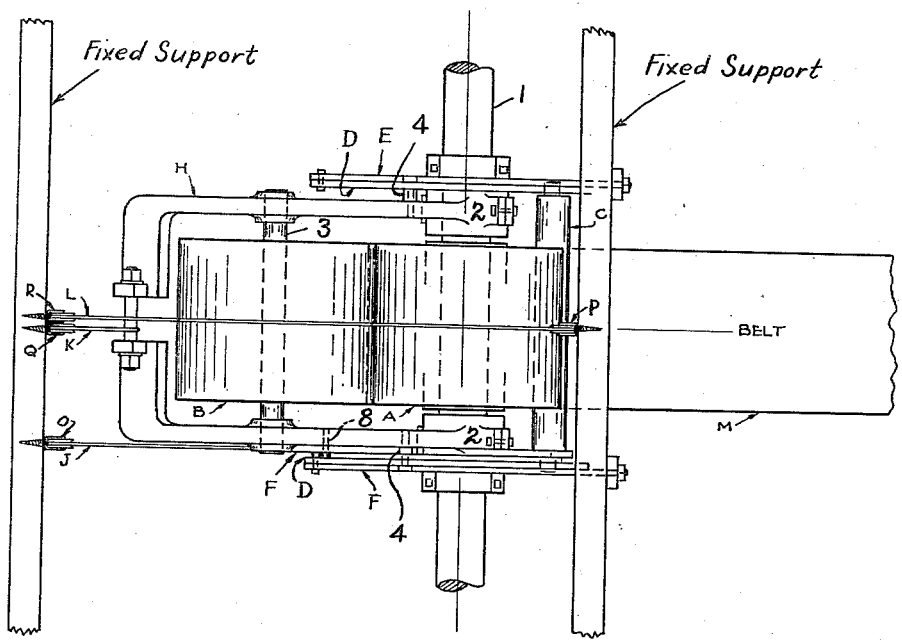

Patented Nov. 14, 1939

2,179,865

UNITED STATES PATENT OFFICE 2,179,865

BELT SHIFTER

Ralph W. Skerratt, Girard, Ohio

Application December 7, 1937, Serial No. 178,453

5 Claims. (Cl. 74—242.5)

My invention relates to belt-and-pulley driving gear, and consists in apparatus for shifting an endless belt, trained over one or more driven pulleys, to and from engagement with a driving pulley.

The apparatus is serviceable in preventing the belt from slipping sideways from the engaged pulleys; and the apparatus is adapted to support the belt entirely out of contact with the driving pulley when the driven pulleys are at rest, thus preventing "burning" of the slack belt, preventing unintentional or untimely starting of the driven pulleys, and eliminating all danger in case the belt should break.

In the accompanying drawings Fig. I is a view in side elevation of apparatus embodying the invention; and Fig. II is a view of the same in plan from above.

Referring to the drawings, a driving pulley A is secured on a power shaft I, and on this shaft a U-shaped yoke H is mounted, with the opposite legs of the U straddling the pulley A and engaging the shaft in bearings 2. Between the legs of the U and above the driving pulley A, an idler pulley B is mounted on an axle 3, and over such idler pulley an endless belt M is trained. From the idler pulley the two reaches of the endless belt extend to and are trained upon the pulley or pulleys (not shown) to be driven. The yoke H is adapted to swing about the shaft I between alternate positions (cf. the full-line and dotted line positions H and H' in Fig. I); in the full-line position, the lower or inner reach of the belt M is held in frictional engagement with the surface of pulley A, and the belt is powerfully driven. When the yoke is swung into dotted line position, the idler pulley B, together with means presently to be described, lifts the belt into dotted line position M', in which position neither reach of the belt trained upon pulley B makes contact with pulley A. Pull-ropes L and K, connected to the distal portion of the yoke H, are trained over grooved wheels P—R and Q, respectively, and extend downward to position of accessibility to the operator, to provide means for swinging the yoke. By pulling downward on rope L, the yoke is swung upward and the belt M lifted into idling position M'; alternately, by pulling downward on rope K, the yoke is swung downward from idling position H' and the belt moved into engagement with driving pulley A.

My apparatus includes a roller C that cooperates with the pulley B in idling position B', in supporting the belt M from contact with the driving pulley A. The roller C is mounted between the lower ends of a pair of levers D, D that are pivotally secured, each intermediate its end to one leg of the yoke H, as indicated at 4 in the drawings. To the upper end of each lever D a link E is pivoted, and, extending upward from such levers, the links E are pivotally secured to a fixed support, as illustrated at 5. When the parts are in full-line positions (Fig. I) and the belt is in engagement with the driving pulley A, the roller C in this case performs no function. When, on the other hand, the yoke H is swung upward about the shaft I, the levers D (by virtue of the link connections E, E) swing into dotted line position, carrying the roller C upward and outward into engagement with the belt. In such movement of the parts the roller C cooperates with the upwardly swung idler pulley B in lifting the belt from engagement with the driving pulley A into idling position.

The links E are perforated at longitudinally spaced intervals, in order that the effective length of the links may be adjusted, to make accommodation for slack in the belt. And it will be perceived that the lower halves of the levers D, D are curved, so that the levers clear the shaft I when the roller C is in its lower position.

In addition to the features described, my apparatus includes a lock for positively securing the parts in idling positions, that is, in the dotted line positions, in which the belt is supported from contact with the driving pulley A. Such means consist in an angularly shaped member F, including a vertical arm which is pivotally secured, at 6, to the link E appearing in Fig. I, and a horizontal arm from whose distal end a pull-rope J extends upward over a grooved pulley O and thence downward to position of accessibility. Said horizontal arm of member F includes an elongate slot 7 that terminates at its inner end in a circular notch G. A headed pin 8 extends transversely through the slot and is rigidly secured in the adjacent leg of the yoke H. When the yoke H is swung into dotted line position, swinging the idler pulley B and roller C upward and lifting the belt into idling position M', the pin 8 slides inward along the slot 7 and lodges in the notch G. A spring N exerts tension on member F, tending to swing it counter-clockwise about the pivot point 6, and insuring positive engagement of the pin in the notch. Such engagement of the pin in the notch manifestly prevents the articulated structure H, D, E, F, from moving from idling position. When the operator desires to set the belt in motion, he first pulls downward on rope J, thereby swinging the member F upward in such manner that the notch G in member F moves from locked engagement with the pin 8, and the pin is freed for movement into and along the slot 7; the operator then pulls downward on the rope K, with the consequence that the parts H, D, E, F, freed of restraint, swing into full-line positions, carrying the belt into driving engagement with the pulley A.

In apparatus of the above-described structure, the advantages and aims alluded to are realized in fullest measure, and it will be understood that various modifications and refinements may be made within the terms of the appended claims.

I claim as my invention:

1. A pulley mounted on a shaft, a yoke member mounted astraddle said pulley and arranged to turn on the axis of said shaft, a second pulley mounted in said yoke member at an interval radially outward from the periphery of the shaft-borne pulley, an endless belt trained upon said second pulley, the two reaches of such belt extending on one side of said shaft-borne pulley, means adapted to swing said yoke member between a position in which one of said reaches of the belt is held in engagement with the periphery of the shaft-borne pulley, and a position in which both of said reaches are held out of engagement with such pulley, and a manually releasable locking device for securing said yoke member in the position last-mentioned.

2. The structure of the next-preceding claim, in which a lever is pivotally mounted on said yoke member, a roller carried by said lever, and means effective to turn said lever relatively to the yoke member, when the yoke member is swung on the axis of said shaft into the position last-mentioned, whereby said roller cooperates with the yoke-borne pulley in supporting said belt out of engagement with the shaft-borne pulley.

3. Belt-shifting apparatus organized with a pulley on an overhead shaft, said apparatus including a yoke mounted on said shaft astraddle said pulley, a second pulley, said second pulley being mounted between the legs of said yoke at an interval radially outward from the first pulley, an endless belt trained upon said second pulley, the two reaches of said belt extending on one side of said first pulley, means for manually swinging said yoke and moving said second pulley circumferentially of the first pulley between a position in which one of said reaches of the belt is held in frictional engagement with said first pulley and a position in which both reaches of the belt are held out of engagement with said first pulley, a lever pivotally borne by said yoke, a belt-engaging member carried by said lever, and a mechanical linkage cooperating with said lever in such manner that, when said yoke is swung from the first to the second of said positions and the point of pivotal mounting of the lever moves circumferentially of said shaft, said lever moves angularly relatively to the yoke and shifts said member into belt-supporting position.

4. Belt-shifting apparatus organized with a pulley on an overhead shaft, said apparatus including a yoke mounted on said shaft astraddle said pulley, a second pulley, said second pulley being mounted between the legs of said yoke at an interval radially outward from the first pulley, an endless belt trained upon said second pulley, the two reaches of said belt extending on one side of said first pulley, means for manually swinging said yoke and moving said second pulley circumferentially of the first pulley between a position in which one of said reaches of the belt is held in frictional engagement with said first pulley and a position in which both reaches of the belt are held out of engagement with said first pulley, a lever pivotally borne by said yoke, a belt-engaging member carried by said lever, and a mechanical linkage cooperating with said lever in such manner that, when said yoke is swung from the first to the second of said positions and the point of pivotal mounting of the lever moves circumferentially of said shaft, said lever moves angularly relatively to the yoke and shifts said member into belt-supporting position, together with a manually releasable device for locking the yoke in the second position.

5. Belt-shifting apparatus for organization with a drive-pulley, said apparatus including two supporting members, one carrying a driven pulley upon which an endless belt is trained and the other carrying a belt-engaging roller, said two supporting members being movable in unison on the axis of the drive-pulley and simultaneously movable angularly to each other between a position in which said belt, engaged by said driven pulley and said roller, is held from contact with said drive-pulley and a position in which said belt is held in frictional engagement with the drive-pulley.

RALPH W. SKERRATT.